United States Patent [19]

Kondo et al.

[11] 4,389,596
[45] Jun. 21, 1983

[54] PHOTOMETRY POWER SUPPLY FOR AUTOMATIC ELECTRONIC FLASH

[75] Inventors: Isao Kondo; Hiroaki Nakamura, both of Hachioji, Japan

[73] Assignee: Olympus Optical Company Ltd., Japan

[21] Appl. No.: 319,424

[22] Filed: Nov. 9, 1981

[30] Foreign Application Priority Data

Dec. 5, 1980 [JP] Japan .................................. 55-172451

[51] Int. Cl.³ .............................................. H05B 41/36
[52] U.S. Cl. .................................. 315/151; 315/241 P
[58] Field of Search .................. 354/33, 34, 60 F, 145; 315/241 P, 151

[56] References Cited

U.S. PATENT DOCUMENTS 4,258,297  3/1981  Nakajima .................... 315/241 P

FOREIGN PATENT DOCUMENTS 4838413 11/1971 Japan .
51-51253  1/1976 Japan .
51-51254  1/1976 Japan .
52-15224  4/1977 Japan .
52-47327 12/1977 Japan .

Primary Examiner—William B. Perkey
Attorney, Agent, or Firm—Ostrolenk, Faber, Gerb & Soffen

[57] ABSTRACT

A photometry power supply for automatic electronic flash comprises an impedance element through which part of the charge stored across a main capacitor of the electronic flash discharges to develop a voltage thereacross which may be used as a power supply for a photometric circuit.

5 Claims, 7 Drawing Figures

PHOTOMETRY POWER SUPPLY FOR AUTOMATIC ELECTRONIC FLASH

BACKGROUND OF THE INVENTION

The invention relates to a photometry power supply for automatic electronic flash, and more particularly to a power supply for a photometric circuit which may be used in an automatic electronic flash in which photometry of reflected light from an object being photographed which is illuminated by flashlight from a flash discharge tube causes the emission of the flashlight to be interrupted automatically whenever a proper photometric value is reached.

A photometric circuit used in an automatic electronic flash requires the supply of an operating voltage thereto in order to initiate a photometric operation at the time when reflected light from an object being photographed is incident thereon. To meet this need, the prior art provided a feeding capacitor which is separate from a main capacitor, or an impedance element which is connected in series with a flash discharge tube. A conventional power supply for a photometric circuit used in an automatic electronic flash will be described first.

FIG. 1 illustrates an automatic electronic flash disclosed in Japanese Patent Publication No. 38,413/1973 including a flashlight emission circuit 1. The circuit 1 includes a trigger switch 2 which may be closed to trigger a flash discharge tube 3. Thereupon, the charge stored on a main capacitor 4 discharges through the tube to emit flashlight, and the amount of light reflected from an object being photographed is determined by a photometric circuit 7 comprising a photoconductor 5 and an integrating capacitor 6. When the photometric value which is determined reaches a given value, a relay discharge tube 8 is rendered conductive to energize an emission control element 9, which operates to cease the emission of flashlight from the discharge tube 3. The photometric circuit 7 utilizes a capacitor 11 which is charged to a constant voltage by a supply circuit 10, as its power supply, and is fed therefrom through a switch 12 which is closed to initiate the photometric operation in synchronized relationship with the closure of the trigger switch 2.

However, in the described electronic flash, the power supply for the photometric circuit requires the provision of its devoted feeding capacitor 11, precharged by the supply circuit 10 associated with the electronic flash, independently from the main capacitor. Also, the switch 12 which initiates the photometric operation in interlocked relationship with the trigger switch 2 must be separately provided, resulting in an increased size and complex construction of the electronic flash. In addition, the arrangement is subject to the occurrence of a malfunctioning in response to a trigger noise.

FIG. 2 illustrates another arrangement for an automatic electronic flash disclosed in Japanese Patent Publication No. 47,327/1977. In this arrangement, when a flash discharge tube 13 is triggered and emits flashlight by allowing a discharge of a main capacitor 14 therethrough, a photometric circuit 15 is fed from an associated supply circuit 16 including a feeding capacitor 17, which discharges through a path including the discharge tube 13, Zener diode 18 and resistor 19 whenever the discharge tube 13 is triggered into conduction, thereby developing a voltage of a constant magnitude across the Zener diode 18 which is utilized as an operating voltage by the photometric circuit 15. When the photometric circuit 15 is fed from the Zener diode 18, there occurs a flow of photocurrent in accordance with the incidence of reflected light from an object being photographed upon a photoelectric transducer element 20 to thereby charge a capacitor 21. When the voltage across the capacitor 21 reaches a given value, UJT (unijunction transistor) 22 conducts, supplying a trigger pulse to the gate of a thyristor 23 to render it conductive, thereby terminating the emission of flashlight from the discharge tube 13.

The described electronic flash is again provided with the feeding capacitor 17 which is charged separately from the main capacitor 14 in order to feed the photometric circuit 15. Since the voltage across the capacitor 17 is utilized as the power supply for the photometric circuit 15, an increased size and a complex arrangement of the resulting network are unavoidable. In addition, since the feeding capacitor 17 discharges as the discharge tube 13 emits flashlight, to develop the supply voltage across the Zener diode 18 after the initiation of emission of flashlight from the discharge tube 13, it follows that the supply voltage to the photometric circuit 15 disadvantageously has a very poor rising end.

FIG. 3 shows a further automatic electronic flash disclosed in Japanese Utility Model Publication No. 253/1976. In this arrangement, as a flash discharge tube 24 is triggered into conduction by a trigger circuit 25, the charge stored across a main capacitor 27 which has been previously charged from a supply battery 26 discharges through a series combination of the flash discharge tube 24 and a resistor 28. The voltage developed across the resistor 28 charges another capacitor 29 to enable a photosensitive element 30 to be responsive to reflected light from an object being photographed which is illuminated by flashlight produced by the flash discharge tube 24, to produce a current in accordance with the amount of such incident light. This current is fed to an integrating circuit 31, thus operating it. When an integral formed by the integrating circuit 31 reaches a given value, a signal generator 32 and an associated driver 33 are operated to drive a discharge element 34, which is effective to terminate the emission of flashlight from the discharge tube 24.

In the arrangement of FIG. 3, the resistor 28 which is utilized to derive an operating voltage for the photometric circuit by charging the capacitor 29 is connected in series with the flash discharge tube 24, thus representing a loss in the emission of flashlight from the discharge tube 24, thus causing a reduction in its luminous efficiency. In addition, as in the arrangement of FIG. 2, the supply voltage has a poor rising characteristic at the initiation of the photometric operation since the capacitor 29 begins to be charged after the emission of flashlight from the discharge tube 24.

It will be seen from the foregoing that the power supply for the photometric circuit utilized in a conventional automatic electronic flash employs either a capacitor, separate from a main capacitor and which is previously charged by a power supply associated with the electronic flash or an impedance element such as a resistor connected in series with a flash discharge tube, so that the supply voltage exhibits a poor rising characteristic or a reduction in the luminous efficiency of the flash discharge tube is caused. In addition, the circuit arrangement cannot be made as compact and simple as desired.

SUMMARY OF THE INVENTION

It is an object of the invention to eliminate the described disadvantages of the prior art by providing a simple and convenient photometry power supply for automatic electronic flash in which part of the charge stored across a main capacitor is utilized to derive an operating voltage for an associated photometric circuit, across an impedance element connected in a discharge path connected in shunt with a main capacitor and which is closed as a flash discharge tube is triggered into conduction.

With the present invention, there is no need for the provision of a devoted capacitor for the photometric circuit which is separate from the main capacitor and which is previously charged, as required in the prior art. Part of the charge stored across the main capacitor is utilized in a sophisticated manner to provide the power supply for the photometric circuit, providing a simple and compact arrangement. Since the supply voltage for the photometric circuit is produced before the emission of flashlight from the flash discharge tube in response to the application of the trigger voltage thereto, the photometric circuit is not influenced by any trigger noise. In addition, the supply voltage has a rapid rising end, assuring a high performance operation of the photometric circuit. Because no impedance element is connected in the discharge path of the flash discharge tube as used in the prior art, no loss is produced.

DESCRIPTION OF PREFERRED EMBODIMENTS

Figure 1:
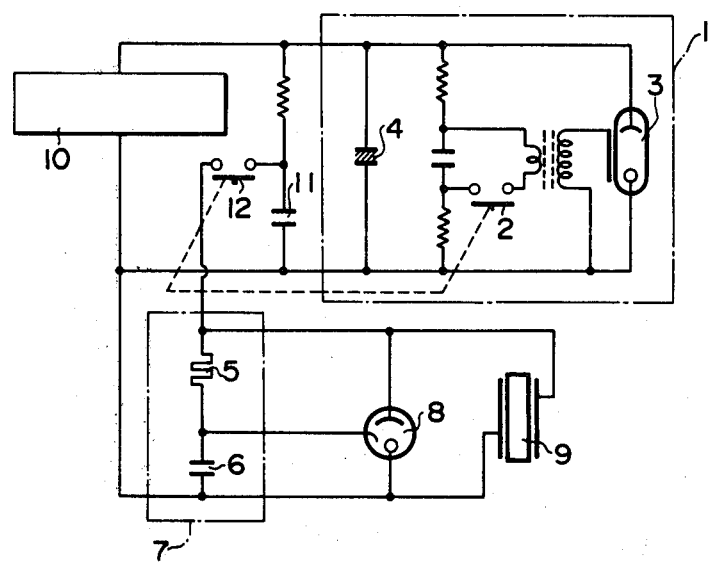
FIGS. 1 to 3 are circuit diagrams of several examples of an automatic electronic flash including a conventional photometry power supply.
Figure 2:
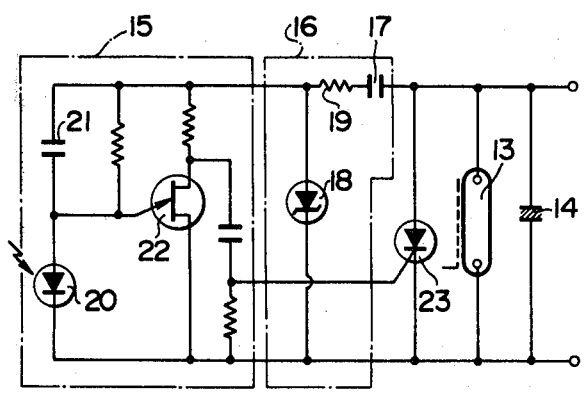
Figure 3:
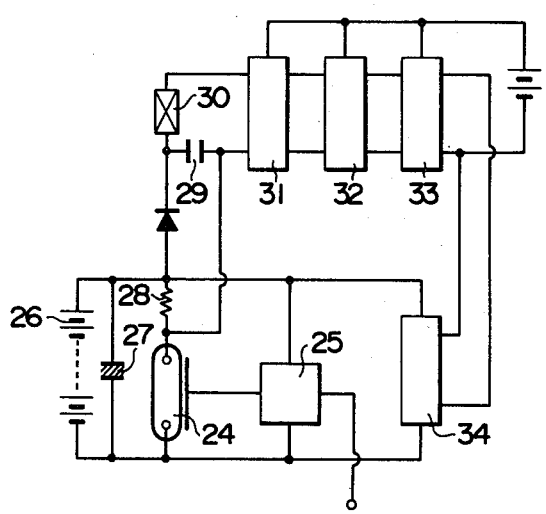
Figure 4:
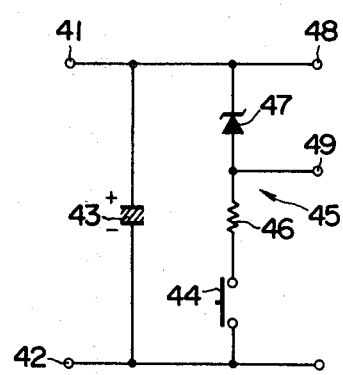
FIG. 4 is a circuit diagram of a photometry power supply according to one embodiment of the invention.

Referring to FIG. 4, there is shown a circuit diagram of the photometry power supply according to one embodiment of the invention. The photometry power supply includes a pair of supply terminals 41, 42 which are adapted to be connected to a supply circuit, not shown, of an electronic flash. A main capacitor 43 is connected across the terminals 41, 42, and a discharge path 45 is connected in shunt with main capacitor 43 and includes a trigger switch 44 which may be closed to complete the discharge path. It should be noted that the discharge path 45 is separate from a discharge loop associated with a flash discharge tube, not shown, and comprises a series combination of resistor 46 and Zener diode 47 connected in series with the trigger switch 44 which is used to trigger a flash discharge tube into conduction. A pair of supply terminals 48, 49 for connection with the photometric circuit is connected across the Zener diode 47. In the circuit arrangement described, the closure of the trigger switch 44 completes the discharge path 45, whereby part of the charge stored across the main capacitor 43 discharges through the Zener diode 47, resistor 46 and trigger switch 44, thus developing an operating voltage of constant magnitude across the terminals 48, 49 or across the Zener diode 47, which may be utilized to operate the photometric circuit.

Figure 5:
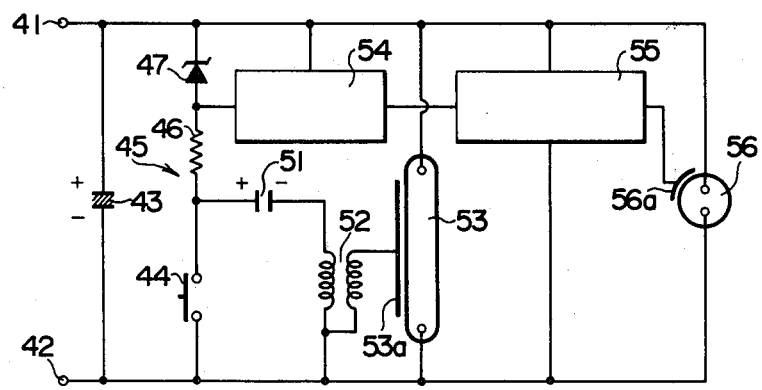
FIG. 5 is a circuit diagram of an automatic electronic flash including the photometry power supply shown in FIG. 4.

FIG. 5 is a circuit diagram of an automatic electronic flash including the photometry power supply shown in FIG. 4. As before, the main capacitor 43 is connected across the supply terminals 41, 42, and is shunted by the discharge path 45 comprising a series combination of the Zener diode 47, resistor 46 and trigger switch 44. The junction between the resistor 46 and trigger 44 of the discharge path is connected through a trigger capacitor 51 to one end of a primary coil of a trigger transformer 52 having a secondary coil, one end of which is connected to a trigger electrode 53a of a flash discharge tube 53 connected across the supply terminals 41, 42. It will be noted that the other end of the primary and the secondary coil of the trigger transformer 52 are connected in common to the supply terminal 42. A photometric circuit 54 has its power input terminals connected across the Zener diode 47, namely, to the supply terminal 41 and to the junction between the anode of the Zener diode 47 and the resistor 46. An output terminal of the photometric circuit 54 is connected to a trigger circuit 55 associated with a bypass tube 56. It will be seen that the trigger circuit 55 is connected across the supply terminals 41, 42 to be fed therefrom. An output terminal of the trigger circuit 55 is connected to a trigger electrode 56a of a bypass tube 56 which is connected across the supply terminals 41, 42 in shunt with the discharge tube 53.

In the circuit arrangement of FIG. 5, when the power is supplied across the supply terminals 41, 42, both the main capacitor 43 and trigger capacitor 51 are charged to the polarity shown. When the trigger switch 44 is closed in synchronized relationship with the opening of a shutter of the camera, the trigger capacitor 51 discharges through the trigger switch 44 and primary coil of the trigger transformer 52, whereby a trigger pulse is developed across the secondary coil thereof to trigger the flash discharge tube 53 into conduction. Thereupon, the charge stored across the main capacitor 43 discharges through the flash discharge tube 53, which therefore begins to emit flashlight. Also when the trigger switch 44 is closed, the discharge path 45 is completed, whereby part of the charge across the main capacitor 43 discharges through the Zener diode 47, resistor 46 and trigger switch 44 to develop a voltage of constant magnitude across the Zener diode 47, which is supplied to the photometric circuit 54 as the operating voltage thereof.

As will be recognized, the photometric circuit 54 contains a photometric, light receiving element or photoelectric transducer element which is responsive to reflected light from an object being photographed which is illuminated by the flashlight emitted by the flash discharge tube 53. When a proper exposure is reached, the photometric circuit 54 produces an emission interrupt signal, which is applied to the trigger circuit 55 to cause the latter to produce a trigger pulse, which is then applied to the trigger electrode 56a of the bypass tube 56. Thus the bypass tube 56 discharges the main capacitor 43 at this instant, interrupting or terminating the emission of flashlight from the flash discharge tube 53.

Figure 6:
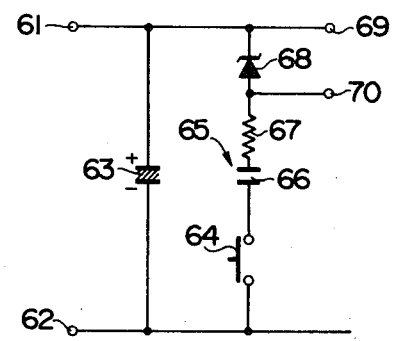
FIG. 6 is a circuit diagram of a photometry power supply according to another embodiment of the invention.

FIG. 6 is a circuit diagram of a photometry power supply according to another embodiment of the invention. A supply circuit, not shown, of an electronic flash is connected with a pair of supply terminals 61, 62, across which a main capacitor 63 is connected in shunt with a discharge path 65 including a trigger switch 64 which may be closed to complete the discharge path. As in the previous embodiment, the discharge path 65 is separate from a discharge loop associated with the flash discharge tube, not shown. The discharge path comprises a series combination of the trigger switch 64, capacitor 66, resistor 67 and Zener diode 68. A pair of supply terminals 69, 70 for feeding a photometric circuit are connected across the Zener diode 68. As in the circuit arrangement of FIG. 4, the closure of the trigger switch 64 completes the discharge path 65, whereby part of the charge stored across the main capacitor 63 discharges through the Zener diode 68, resistor 67, capacitor 66 and trigger switch 64. The presence of the capacitor 66 within the discharge path 65 permits the discharge current to be limited by a time constant formed by the resistor 67 and capacitor 66, whereby an operating voltage of a given level which may be utilized by the photometric circuit is developed across the Zener diode 68 or across the terminals 69, 70 only during a time interval of a given short duration.

Figure 7:
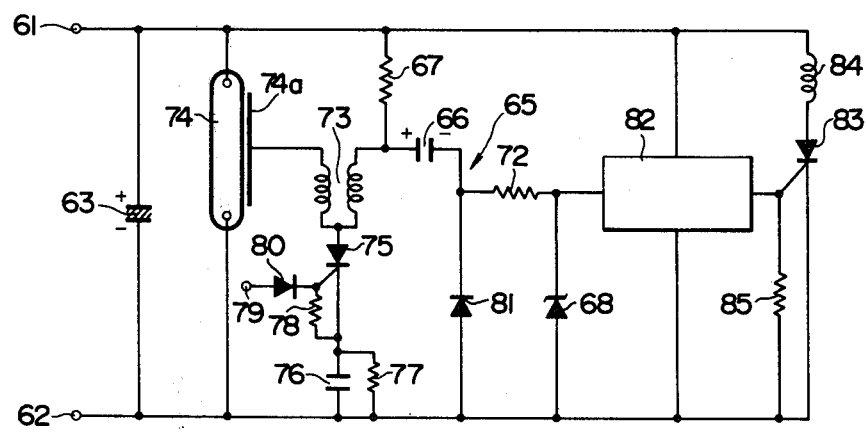
FIG. 7 is a circuit diagram of an automatic electronic flash including the photometry power supply shown in FIG. 6.

FIG. 7 is a circuit diagram of an automatic electronic flash including the photometry power supply shown in FIG. 6. It should be noted that the photometry power supply is slightly modified from that shown in FIG. 6. As before, the main capacitor 63 is connected across the supply terminals 61, 62, and is shunted by the discharge path 65 comprising a series combination of resistor 67, trigger capacitor 66, resistor 72 and Zener diode 68. In the arrangement of FIG. 6, the Zener diode 68 contained in the discharge path 65 develops a Zener voltage which is referenced to the positive terminal of the main capacitor 63, whereas in the arrangement of FIG. 7, the Zener diode develops a Zener voltage which is referenced to the negative terminal of the main capacitor 63. In the arrangement of FIG. 7, the trigger switch 64 which is shown in FIG. 6 is not contained in the discharge path 65, but remains to be identical in principle with the arrangement of FIG. 6. The junction between the resistor 67 and trigger capacitor 66 in the discharge path 65 is connected to one end of the primary coil of a trigger transformer 73 having a secondary coil, one end of which is connected to the trigger electrode 74a of a flash discharge tube 74 which is in turn connected across the supply terminals 61, 62. The other end of the primary and the secondary coil of the trigger transformer 73 is connected in common to the anode of a thyristor 75, the cathode of which is connected to the supply terminal through a parallel combination of a capacitor 76 and resistor 77. A resistor 78 is connected across the gate and cathode of the thyristor 75, and the gage is connected to the cathode of a diode 80, the anode of which is in turn connected to a terminal 79, to which a trigger voltage is applied. The junction between the capacitor 66 and resistor 72 in the discharge path 65 is connected to the cathode of a diode 81, the anode of which is connected to the supply terminal 62. The junction between the resistor 72 and Zener diode 68 is connected to a power input of a photometric circuit 82 which is in turn connected across the supply terminals 61, 62. Thus, the voltage developed across the Zener diode 68 is supplied to the photometric circuit 82 as a voltage which initiates its operation. As is well recognized, the photometric circuit 82 comprises a light integrating circuit including a photoelectric transducer element such as photodiode, phototransistor or the like, and a driver circuit responsive to an output from the integrating circuit to operate a final stage which operates to interrupt the emission of flashlight. The output terminal of the drive circuit represents the output terminal of the photometric circuit 82, which is connected to the gate of a thyristor 83. The thyristor 83 corresponds to the bypass tube 56 shown in FIG. 5, and operates to bypass the current flow through the flash discharge tube 74 as it conducts. The anode of the thyristor 83 is connected through a coil 84 to the supply terminal 61 while the cathode is connected directly to the supply terminal 62, with its gate being connected through a resistor 85 to the supply terminal 62.

In the circuit arrangement of FIG. 7, as the power supply is connected across the supply terminals 61, 62, both the main capacitor 63 and trigger capacitor 66 are charged to the polarity shown. In response to the application of a positive trigger voltage to the terminal 79 in synchronized relationship with the shutter opening of a camera, the thyristor 75 is rendered conductive, whereby the charge stored across the trigger capacitor 66 discharges through a path including the primary coil of the trigger transformer 73, thyristor 75, capacitor 76 and diode 81, thus producing a trigger pulse across the secondary coil of the trigger transformer 73 to trigger the flash discharge tube 74 into conduction. Thereupon, the discharge tube 74 causes a discharge of the main capacitor 63 therethrough to initiate the emission of flashlight. As the trigger capacitor 66 discharges, the capacitor 76 is charged. The trigger capacitor 66 ceases to discharge and simultaneously the thyristor 75 is rendered non-conductive at the time when a voltage Vc1 across the capacitor 66 is equal to a voltage Vc2 across the capacitor 76. It is to be noted that by choosing the capacitance C1 of the capacitor 66 to be equal to or less than the capacitance C2 of the capacitor 76, the residual voltage at the completion of the discharge of the capacitor 66 may be reduced. When the thyristor 75 becomes non-conductive, part of the charge stored across the main capacitor 63 discharges through a path including the resistor 67, trigger capacitor 66, resistor 72 and Zener diode 68, thus developing a constant voltage across the Zener diode 68 which is utilized as an operating voltage for the photometric circuit 82. It will be noted that the magnitude of a current which flows from the main capacitor 63 into the discharge path 65 depends on a time constant formed by the resistor 67 and trigger capacitor 66 and the residual voltage on the main capacitor 63. Accordingly, the time constant formed by the resistor 67 and capacitor 66 is chosen so that the current continues to flow through the Zener diode 68 during the time the main capacitor 63 discharges through the flash discharge tube 74 to allow the emission of flashlight therefrom. During the time the constant voltage is supplied from the Zener diode 68, the photometric circuit 82 operates and produces a trigger signal which is applied to the thyristor 83 to terminate the emission of flashlight at the time when the photometric value determined reahes a proper value. Thereupon, the thyristor 83 is rendered conductive to bypass the discharge through the flash discharge tube 74, thus terminating the emission of the flashlight therefrom.

It should be understood that in each of the described embodiments, any other impedance element than Zener diode may be utilized to derive an operating voltage for the photometric circuit.

What is claimed is:

1. Apparatus, comprising:
   a main capacitor connected to a power supply;
   a first discharge circuit for discharging a trigger capacitor in response to the actuation of a trigger switch;
   a flash discharge tube connected to said main capacitor in such a manner that said main capacitor discharges through said flash tube, causing said flash tube to emit light, in response to the discharge of said trigger capacitor;
   a second discharge circuit for discharging part of the charge on said main capacitor once said first discharge circuit has stopped discharging said trigger capacitor, said second discharge circuit including said trigger capacitor;
   an impedance element forming part of said second discharge circuit for developing a voltage thereacross as said part of the charge of said main capacitor is discharged through said second discharge circuit;
   a photometric circuit powered by said voltage developed across said impedance element; and
   means for terminating the emission of flash light from said flash discharge tube whenever a proper photometric value, as measured by said photometric circuit, is reached.

2. Apparatus according to claim 1, in which said second discharge circuit includes a resistor, the time constant formed by said resistor and said trigger capacitor determining a time duration during which said voltage is developed across said impedance element.

3. Apparatus according to claim 1, in which said impedance element includes a Zener diode.

4. Apparatus according to either one of claims 1 or 2, wherein said first discharge circuit includes one capacitor in addition to said trigger capacitor.

5. Apparatus according to claim 4, wherein the capacitance of said trigger capacitor is equal to or less than that of said one capacitor.

* * * * *